April 28, 1964    J. J. RYAN    3,130,988
HOSE COUPLING
Filed Oct. 14, 1959
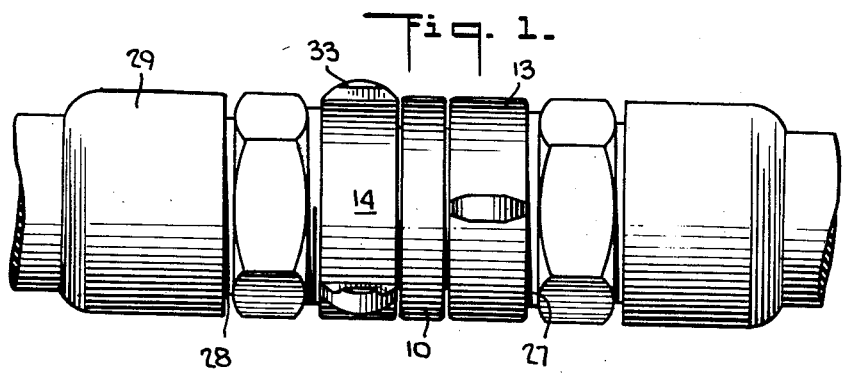
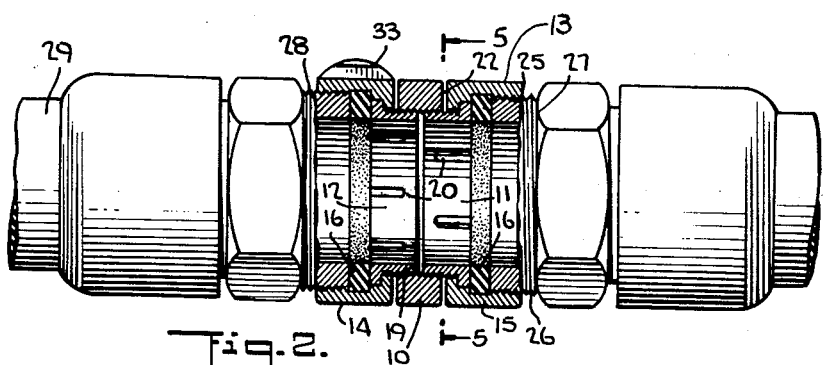
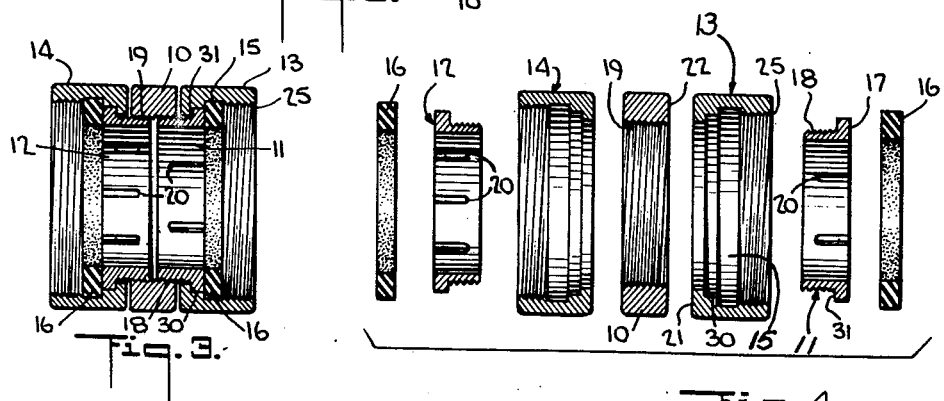
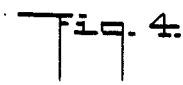
INVENTOR.
John J. Ryan
BY
ATTORNEY

United States Patent Office 3,130,988
Patented Apr. 28, 1964

3,130,988
HOSE COUPLING
John J. Ryan, Darien, Conn., assignor to Bar-Way Manufacturing Company, Stamford, Conn., a corporation of Connecticut
Filed Oct. 14, 1959, Ser. No. 846,313
1 Claim. (Cl. 285—175)

This invention relates to a hose coupling construction of that type used to join the ends of two separate hoses. In hose couplings of the class described, it is customary to utilize a central coupling ring on which is mounted for rotation a pair of coupling nuts, there being one nut at each end of the coupling ring. Each nut, in turn, carries a washer and is adapted to be screwed on to the end of the usual threaded sleeve carried by the end of a hose. By rotating the coupling nut relatively to the central coupling ring, the end coupling part of a hose to be coupled, is forced against the washer carried by the coupling nut, with the washer inturn compressed against the surface of the central coupling ring. Naturally, this takes place at each end of the coupling ring so that the final result brings about a union of two hoses relatively to the central coupling ring with the two coupling nuts effecting this union through rotation relatively to the central coupling ring.

It is important, naturally, in a construction of the type described, that each coupling nut be retained by the coupling ring while at the same time, each coupling nut be allowed to rotate relatively to its coupling ring and to effect forceful movement of one end of the coupling ring against the coupling part of the hose with the washer of the coupling nut between the two surfaces thus brought together. In other words, the coupling nut must exert end pressure against its coupling ring while being yet free for rotation relatively thereto and while being retained from removal therefrom.

In the prior art, it has been customary to mount a coupling nut about a coupling ring and then to apply between these two parts a series of balls operating in mating grooves, or else a series of disks operating in such grooves. Sometimes a wire has been utilized. In any event, the balls, the disks, or the wire, must be introduced between each coupling nut and the central coupling ring in such a manner as to hold the two against endwise separation while yet allowing the coupling nut to exert endwise pressure on the coupling ring. Because of the very hard service to which devices of this class are subjected, it is obvious that the balls or disks or wire may bind, particularly when endwise pressure is applied by the nut to the coupling ring through the medium of the balls or disks, as the case may be. Much difficulty has resulted, despite the very considerable cost of the particular construction.

My invention relates particularly to an extremely novel concept whereby I may mount a pair of coupling nuts for free rotation relatively to a central coupling ring while still making possible the effective application of endwise pressure by each coupling nut to its ring. Thus, when each coupling nut forces one end of the ring against the end of a hose coupling part with a washer therebetween, the end pressure is taken by circular surfaces lying juxtaposed, rather than by disks, balls, or a wire.

Broadly, my concept involves the utilization of a central coupling ring that is internally threaded for a pair of retainer rings. The two retainer rings, one for each end of the coupling ring, are so threaded relatively to the central coupling ring that when each is rotated on its threads relatively to the central coupling ring, the threads bind so that there finally results what is in effect a single unitary structure comprising the central coupling ring and the two retainer rings. Each retainer ring is adapted, through being driven inwardly on the threads of the central coupling ring, to hold in retained relation a coupling nut. The rotation of the coupling nut will be effective to force against its retainer ring the end of a hose coupling part, with a washer between the retainer ring and the hose coupling part. Further, the coupling nut can exert end pressure against its retainer ring through smooth cooperating circular areas, accurately machined. These areas will naturally accept very considerable stress without bind and without mutilation of the surfaces.

As a further feature of the invention, the retainer rings are so formed that they may be driven home into binding relation with the central coupling ring by means of a tool operating in grooves formed in the interior circular surface of each retainer ring.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claim be regarded as including such equivalent constructions as do not depart from the spirit and scope of my invention, in order to prevent the appropriation of my invention by those skilled in the art.

Referring now to the drawings:

FIG. 1 is a plan view showing my new coupling in assembled relation to a pair of hose ends.

FIG. 2 is a longitudinal section through certain of the parts of FIG. 1 to illustrate the construction.

FIG. 3 is a section through entire coupling construction of my invention with the hose ends removed.

FIG. 4 is an exploded view of the parts of FIG. 3.

FIG. 5 is a section along line 5—5 of FIG. 2.

Referring now more particularly to the drawings, and especially FIGS. 2, 3 and 4, the central coupling ring of my invention is designated by reference numeral 10. The right hand retainer ring is designated by reference numeral 11 and the left hand retainer ring, which is a duplicate of retainer ring 11, is designated by reference numeral 12. The right hand coupling nut is designated by reference numeral 13 and the left hand coupling nut, a duplicate of nut 13, is designated by reference numeral 14. In describing the invention, I shall hereafter generally refer to the nut 13 and the retainer ring 11, because of the fact that the construction of my coupling is completely symmetrical with the parts of each side being the same.

Retainer nut 13 is grooved at 15 for a rubber washer 16, this rubber washer being adapted to coact with the surface 17 of the retainer ring 11. In assembling the parts of my invention, the coupling nut 13 is applied over the retainer ring 11 as clearly shown in FIG. 3 and the external threads 18 of retainer ring 11 are then placed into contact with the internal threads 19 of the central coupling ring 10. A suitable tool is placed into the central opening of the retainer ring 11 with parts thereof engaging the grooves 20 formed in the inner surface of the retainer ring 11. Through rotation of the tool, the retainer ring 11 is driven home relatively to the internal threads 19 of central coupling ring 10.

The threads are of tapered construction so that there occurs a binding or locking between threads 18 and threads 19 whereby, in effect, the parts 10 and 11 become the equivalent of a single part. This occurs when the end surface 21 of coupling nut 13 is spaced slightly from end surface 22 of central coupling ring 10, as best illustrated in FIG. 3. The fit between the retainer ring 11, the coupling nut 13 and the central coupling ring 10 is now such that the nut 13 may rotate freely relatively to the now unitary structure 10—11, while nut 13 cannot move endwise from this unitary structure 10—11.

At this point, the washer 16 is applied as shown in FIG. 3. Now, the coupling nut 13 may be applied with its threads 25 over the threads 26 of the end of a hose coupling part 27 of any commercial assembly. It will be obvious that the rotation of the coupling nut will move the end surface of the hose coupling part 27 against the washer 16 as shown in FIG. 2 with pressure exerted through the washer 16 against the end surface 17 of the retainer ring 11. Since retainer ring 11 is now in effect an integral part of the central coupling ring 10, there will be effected a rigid connection between the coupling part 27 and the central coupling ring 10, while the washer 16 is in sealing position.

Naturally, the coupling part 28 of a second hose 29, as shown in FIG. 2, will be assembled through the operation of the coupling nut 14 which has earlier been assembled to the central coupling ring 10 through operation of retainer ring 12. Obviously, there will be no possibility of leakage because fluid will flow from hose to hose through the retainer rings 11—12, the retainer rings being substantially in end to end relationship and with the threads between the retainer rings and the central coupling ring fully locked against flow of fluid.

It should be emphasized again at this point that the force exerted between the coupling parts 27—28 of the hose ends and the ring structures 10—11 will be developed by each coupling nut through its application against a circular solid surface. In the case of the coupling nut 13, it will be the circular surface 30 of the coupling nut operating against the circular surface 31 of the retainer ring.

It may be well to add that preferably the coupling nuts will be cast with lugs 33 as well shown in FIGS. 1, 2 and 5, so as to facilitate operation of the coupling nuts manually or by tools other than ordinary wrenches. I do believe that the rather considerable merits of my invention will now be fully understood by those skilled in the art.

I now claim:

In a combination of the class described, a pair of internally bored coupling nuts, each formed as an integral one-piece body, a retainer ring for each of said nuts having a flange at the outer end thereof with the inner face of said flange fitting against a shouldered flange formed on its nut so that each nut is prevented from slipping off the flanged end of its retainer ring, a resilient washer held partially in a groove formed in each of said nuts and extending out of the groove to lie against the outer face of its retainer ring flange, a central coupling ring internally threaded, threads on the exterior surface of each of said retainer rings inwardly of its flanged end whereby each of said retainer rings may be screwed into said central coupling ring after passing through the internal bore of one of said one-piece coupling nuts into a retaining position relatively to said coupling nuts, said threads of said retainer rings and said central coupling ring being formed for wedging interlock when driven home whereby an integral assembly, in effect, is formed by said central coupling ring and said two retainer rings with a flange of each retaining ring retaining a nut freely rotatable relatively to the resulting one-piece coupling ring and nut retainer, said retainer rings being slightly spaced from one another, internally of said coupling ring when forming with said coupling ring a one-piece body, whereby to ensure said wedging of said retainer rings to said central coupling ring, each of said nuts being threaded on parts of its internal bore outwardly of the groove thereof containing said washer so as to engage the threads of a hose coupling, the threading action of each nut on a hose coupling drawing the flange of its retainer ring against the end surface of the hose coupling with the said resilient washer therebetween to establish a through single axis passage and a leakproof rigid connection embodying said hose couplings, said washers and said integral body formed by the union of said retainer rings and coupling ring.

References Cited in the file of this patent

UNITED STATES PATENTS

| 265,607 | Jay | Oct. 10, 1882 |
| 476,752 | Lenty | June 7, 1892 |
| 545,066 | Fregean | Aug. 27, 1895 |
| 549,510 | Hall | Nov. 12, 1895 |
| 555,264 | Ricketts | Feb. 25, 1896 |
| 904,673 | Bideker | Nov. 24, 1908 |
| 1,909,075 | Ricker | May 16, 1933 |
| 2,194,973 | Durant | Mar. 26, 1940 |
| 2,687,904 | Tornblom | Aug. 31, 1954 |

FOREIGN PATENTS

| 1,034,432 | Germany | July 14, 1958 |
| 21,432 | Switzerland | Feb. 22, 1901 |